Aug. 26, 1930.   V. J. BURNELLI   1,774,470
AIRPLANE
Filed Nov. 2, 1927   2 Sheets-Sheet 1
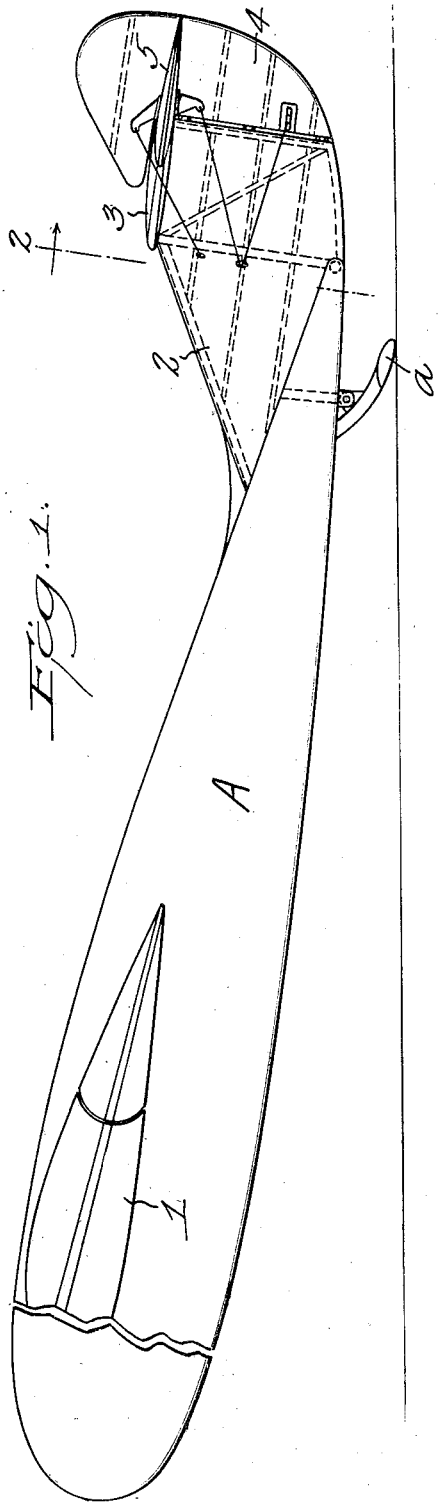
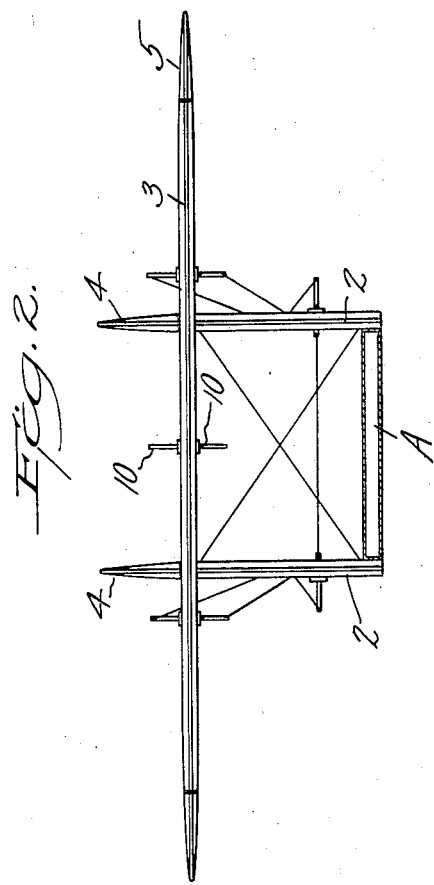

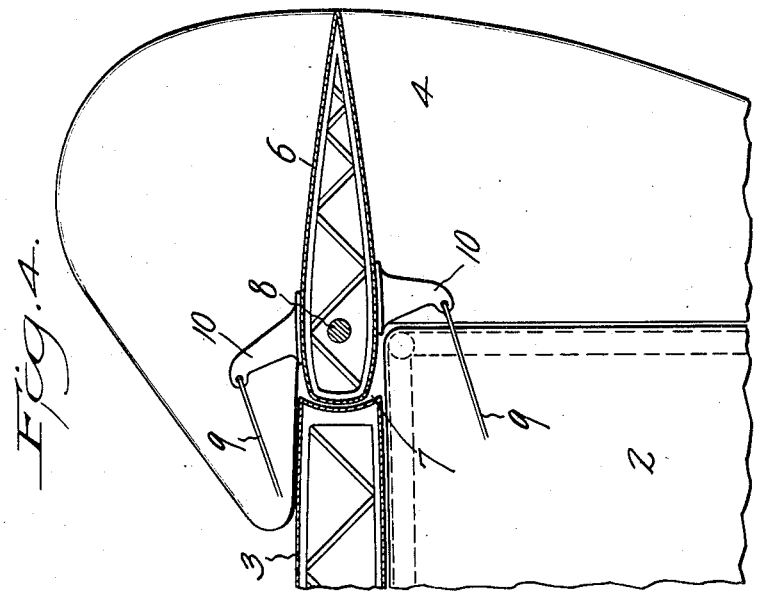
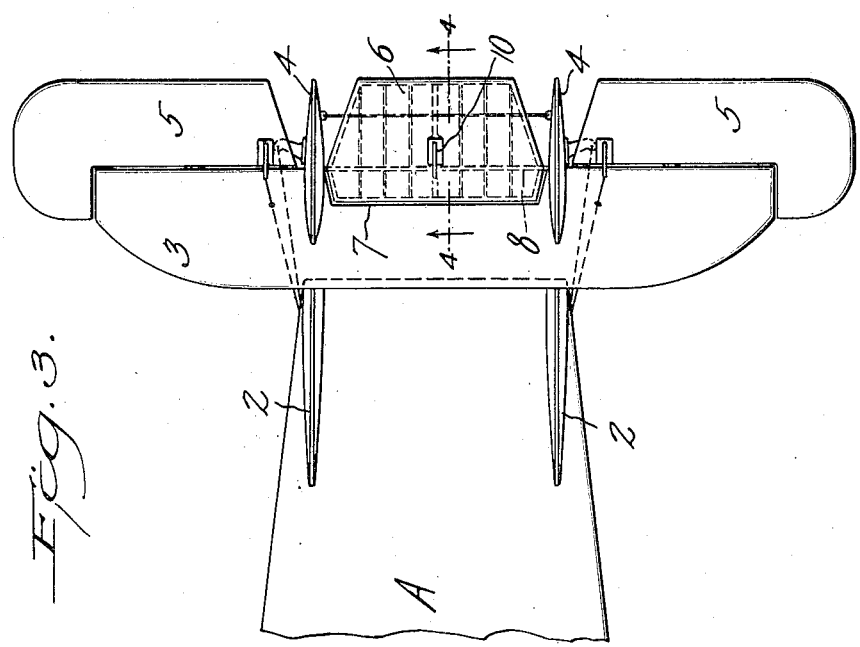

Patented Aug. 26, 1930

1,774,470

UNITED STATES PATENT OFFICE

VINCENT J. BURNELLI, OF NEW YORK, N. Y., ASSIGNOR TO THE UPPERCU-BURNELLI CORPORATION, A CORPORATION OF DELAWARE

AIRPLANE

Application filed November 2, 1927. Serial No. 230,643.

This invention relates to airplanes and my improvements are directed to the novel arrangement of the empennage or tail group with respect to a fuselage that is of airfoil contour throughout and extended rearwardly to constitute a support for the empennage.

Also my invention comprises the employment of what I term a trimmer airfoil, being a relatively small horizontally disposed airfoil, auxiliary to the elevator, as a control member manipulable by the pilot, for trimming the longitudinal flying attitude of the airplane.

Still further my invention includes the positioning of the horizontal stabilizer, which may be either fixed or adjustable, in a plane where it will be non-affected by the wash from the monoplane wings that extend from opposite sides of my said airfoil contoured fuselage.

Other features and advantages of my invention will hereinafter appear.

In the drawings:

Figure 1 is a side elevation of a Remington-Burnelli type airplane having a fuselage of airfoil contour and an empennage extended from the trailing edge thereof, said empennage comprising the vertical fins, longitudinal stabilizer, elevator and vertical rudders in a new arrangement with my improved trimming element.

Fig. 2 is a sectional elevation taken on the line 2—2 of Fig. 1.

Fig. 3 is a plan view of the empennage, and

Fig. 4 is an enlarged side sectional view taken on the line 4—4 of Fig. 3.

In Fig. 1 let A indicate a fuselage in airfoil contour, having side monoplane wings, of which only a wing 1, at one side of the fuselage, appears in the view, the airplane thus shown being represented in the attitude of rising from the surface with its tail skid $a$ still in contact with the surface.

As has been stated the empennage or tail group is extended from the rear portion or trailing edge of the airfoil contoured fuselage, and in order that the members of said tail group may be sufficiently distanced from the supporting wings 1, I may provide suitable extension means for their support.

In the example of my invention herein shown I employ vertical fins 2, 2, which fins are attached to the rear portion of the airfoil contoured fuselage A and extend both upwardly and rearwardly therefrom. The upward extension of said vertical fins enables them to support the horizontal stabilizer 3 in an elevated position, such for example where it is represented in Fig. 1 as removed from the influence of wash from the monoplane wings 1, as well as being out of the path of wash from the airfoil contoured fuselage. Extending the vertical fins 2 rearwardly beyond the fuselage has the effect of providing supporting means for the vertical rudders 4, stabilizer 3, elevator members 5, and trimmer 6, whereby said members are disposed in more effective distanced relation to the supporting wings 1, for efficient control purposes.

The elevated position of horizontal stabilizer 3, in addition to the aerodynamic purpose referred to as thereby served, also removes it from proximity with the surface and enables the airplane to assume a suitable angle of attack in rising and landing without incurring the liability of the stabilizer making contact with the surface in such attitude.

The stabilizer 3, to whose rear edge the elevator members 5 are hinged, is recessed at an intermediate portion 7 of said rear edge, and the trimmer 6, which is mounted on the hinge pintle 8 that carries the elevator members, is adapted at its forward portion to oscillate in the recess thus provided. Said trimmer 6 is a relatively small airfoil which normally lies in the horizontal plane of stabilizer 3 and is manipulable from the pilot's seat as by means of cables 9 connecting with control horns 10 extended from said trimmer.

The purpose of the trimmer airfoil is to provide readily operable means whereby the normal flying attitude of the airplane may be adjusted, the relatively small surface presented by the trimmer creating less drag than would result were the stabilizer to be adjusted in the same service. Besides, less effort is required in the manipulation of this small trimmer than would be required for the operation of an adjustable stabilizer.

This application is a continuation in part of my application Serial No. 435,481, filed January 6, 1921.

Variations within the spirit and scope of my invention are equally comprehended in the foregoing disclosure.

I claim:

1. The combination with an airplane having a supporting airfoil and a fuselage of vertical fins extended rearwardly and upwardly from said fuselage and separate horizontal control members carried by said fins in a single plane disposed at a sufficient height above the supporting airfoil and fuselage to escape the wash therefrom.

2. The combination with an airplane having a fuselage and monoplane wings extended from the sides of said fuselage, of vertical fins extended rearwardly and upwardly from said fuselage, and separate horizontal control members carried by said fins in a single elevated position removed from the wash leaving said wings and fuselage.

3. The combination with an airplane having a fuselage of vertical fins carried by said fuselage and extended rearwardly and upwardly therefrom, a stabilizer supported by said fins and having a rearward recess, a trimming airfoil mounted on said stabilizer, within said recess, control means for said airfoil and an elevator extended from said stabilizer, said stabilizer, trimming airfoil and elevator all lying in the same horizontal plane disposed at a sufficient height above the supporting airfoil and fuselage to escape the wash therefrom.

New York, October 24th, 1927.

VINCENT J. BURNELLI.